Patented Feb. 15, 1944

2,341,614

UNITED STATES PATENT OFFICE 2,341,614

PROCESS FOR PREPARING CAPILLARY ACTIVE SUBSTANCES

Winfrid Hentrich, Rodleben, near Dessau-Rosslau, and Erik Schirm and Heinz-Joachim Engelbrecht, Dessau, Germany; vested in the Alien Property Custodian No Drawing. Application March 26, 1941, Serial No. 385,299. In Germany February 3, 1940

3 Claims. (Cl. 260—556)

This invention relates to capillary active substances and to a process for their preparation. More particularly it relates to a process for preparing capillary active substances from organic sulfohalides having at least one lipophile group in the molecule and ammonia or ammonium salts respectively in the presence of alkaline reacting agents to form sulfimides.

It is an object of this invention to provide the soap, laundry, textile, leather, fur, paper and the like industries with capillary active substances which are readily convertible into water soluble soap like salts and have excellent foaming, washing and cleaning properties.

In the co-pending application of Winfrid Hentrich and Erik Schirm, filed August 3, 1939, Ser. No. 288,130, there is described a process for preparing capillary active substances having the general formula R—$SO_2$—N(Cat)—$SO_2$—R′, wherein at least one of the two substituents R and R′ stands for an organic radical containing at least one lipophile group, which may be interrupted by heteroatoms or heteroatom groups, whereas the other radical may be any hydrocarbon radical which may be interrupted by heteroatoms or heteroatom groups, and Cat denotes any desirable cation which is capable of forming water soluble salts. The process consists in condensing sulfonic acid halides of the general formula R—$SO_2$—Hal with sulfonic acid amides of the general formula R′—$SO_2$—$NH_2$ or its suitable metal derivatives respectively and in converting the obtained condensation products with inorganic or organic bases into water soluble salts.

In accordance with the present invention it has been found that the aforementioned process may be simplified considerably, if in the above noted formula R is equal to R′. In those cases it is not necessary to prepare the sulfonic acid amides R—$SO_2$—$NH_2$ separately and then to condense with the sulfonic acid halides R—$SO_2$—Hal, but the sulfonic acid halides may be reacted simply upon ammonia or any ammonium salt immediately in the presence of alkaline reacting agents, wherein two mols of sulfonic acid halides are used for each mol of ammonia or the equivalent amount of an ammonium salt respectively.

Organic sulfonic acid halides which may be used as raw materials are, e. g., 4-sec. butylbenzenesulfochloride, 4-sec. hexylbenzenesulfochloride, 4-sec. octylbenzenesulfochloride, 4-sec. dodecylbenzenesulfochloride, 4-sec. hexadecylbenzenesulfochloride, diisobutylnaphthalenenesulfochlorides, or other sulfohalides, the hydrocarbon radicals of which are interrupted by heteroatoms such as oxygen, nitrogen or sulfur or by the corresponding heteroatomic groups, e. g., 4-capryloylaminobenzenesulfochloride, 4-caprinoylaminobenzene sulfochloride, a mixture of 4-aminobenzenesulfochlorides acylated on the amino group by paraffin carboxylic acid chlorides with 7–9 carbon atoms. Each of the aforesaid reactive compounds contains, as a lipophile radical, a carbocyclic aromatic nucleus substituted by an aliphatic group of at least 4 carbon atoms.

According to the instant process these sulfonic acid halides are reacted with ammonia or ammonium salts such as ammonium acetate, formiate, carbonate, ammonium chloride and the like in the presence of alkaline reacting agents such as inorganic or organic bases or alkaline reacting salts respectively, e. g., soda, soda lye, sodium acetate, calcium carbonate, pyridine and the like and if necessary in the presence of an organic solvent such as acetone, butanol, benzene, toluene or preferably in the presence of water.

Example

A suspension consisting of 5.5 parts by weight of ammonium chloride, 100 parts by weight of water, 85 parts by weight of acetone and 60 parts by weight of 4-sec. octylbenzenesulfochloride (obtained by treating sec. octylbenzene with chlorosulfonic acid at 0–5° C.) has 10 n-soda lye added drop by drop while stirring at 10–20° C. in such a manner, that the mixture reacts constantly alkaline to phenolphthalein. When the conversion begins to cease the mixture is gradually heated up to 60° whereupon the acetone distills off. The temperature of the mixture is increased to 90° and soda lye is added till the mixture finally reacts weakly alkaline. After cooling the reaction mass, the layer at the bottom of the liquid is dissolved in nearly 500 parts of of water then hydrochloric acid is added till the solution gives an acid reaction to Congo paper. An oil is separated which is dissolved in ether and washed with water until it gives a neutral reaction. After drying and evaporating the ether the 4,4′-di-sec. octylbenzene-disultimide is obtained as a highly viscous dark colored oil in a quantity equalling almost 90% of the theoretical yield. Upon treatment with soda lye the compound is converted into the corresponding sodium salt, which is soluble in water and gives strongly foaming aqueous solutions.

Instead of the 4-sec. octylbenzenesulfochloride one may use the 4-sec. dodecylbenzenesulfochloride and obtains with ammonia a condensation product the alkali salt of which is likewise water soluble and possesses a soap-like character.

We claim:

1. A new capillary active substance, a capillary-active disulfimide selected from the group consisting of the sodium salt of 4,4'-di-sec. octylbenzene-disulfimide and an alkali metal salt of 4,4'-di-sec. dodecyl-benzene-disulfimide.

2. The sodium salt of 4,4'-di-sec. octylbenzene-disulfimide.

3. An alkali metal salt of 4,4'-di-sec. dodecyl-benzene-disulfimide.

WINFRID HENTRICH.
ERIK SCHIRM.
HEINZ-JOACHIM ENGELBRECHT.